July 28, 1942.　　　L. J. ISTAD　　　2,291,081
CONNECTING ROD STRUCTURE
Filed Jan. 17, 1939　　　2 Sheets-Sheet 2

INVENTOR.
Lars J. Istad
BY
his ATTORNEY.

Patented July 28, 1942

2,291,081

UNITED STATES PATENT OFFICE 2,291,081

CONNECTING ROD STRUCTURE

Lars J. Istad, Roselle Park, N. J., assignor, by mesne assignments, to Reconstruction Finance Corporation, New York, N. Y., a corporation of the United States Application January 17, 1939, Serial No. 251,316

14 Claims. (Cl. 74—580)

The present invention relates to connecting rod structures and has particular reference to structure of the kind in which a group of connecting rods are connected to a common crank pin, as in the case of radial engines.

In cases where a number of connecting rods operate on a common crank pin it is desirable to impart like motions to the crank pin ends of the rods and the principal object of the present invention is the provision of new and improved means for imparting like motions to the crank pin ends of a group of connecting rods operating on a common crank pin.

To this end the invention contemplates the use of a connecting rod mounting member rotatably mounted on the crank pin and to which the crank ends of the connecting rods are secured by articulated connections, which mounting member is constrained, by means more fully described hereinafter, to turn relative to the crankpin in a manner giving the desired like paths of travel to the crank ends of the rods.

In so far as the principles of the invention are concerned, it is immaterial whether, as in the usual type of radial engine, the cylinder bank is stationary and the crankshaft rotating, or vice versa. The invention is also equally applicable to radial engines of the bi-rotary type in which both the cylinder bank and the crankshaft revolve but at different speeds, since it is only the relative motion between crankshaft and cylinder bank that need be taken into consideration in order to achieve the objects of the invention.

The manner in which the above stated general object and other and more detailed objects of the invention are attained and the advantages to be derived from the use of the invention may best be understood from a consideration of the ensuing portion of this specification in which apparatus suitable for carrying the invention into effect will be described as embodied in a radial engine of the usual form having stationary cylinder bank and rotating crankshaft.

In the accompanying drawings illustrative of the embodiment to be described:

Fig. 3 is a transverse section of one form of crankshaft structure embodying certain features of the invention;

Fig. 4 is a section taken on the line 4—4 of Fig. 3; and

Fig. 5 is a fragmentary section showing a modification of the construction illustrated in Fig. 1.

Figure 1:
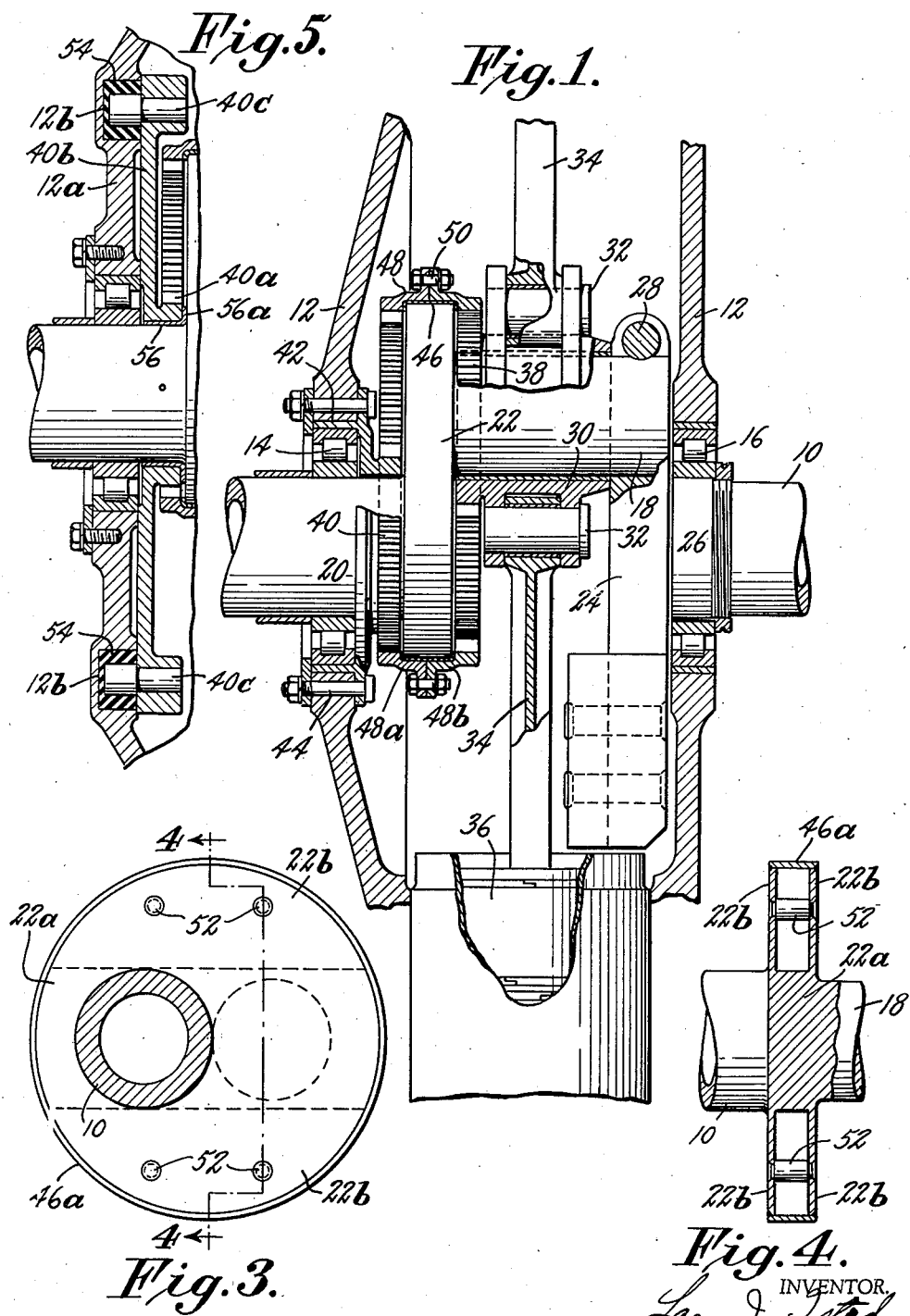
Fig. 1 is a fragmentary central longitudinal section of a radial engine provided with connecting rod structure embodying the invention.
Figure 2:
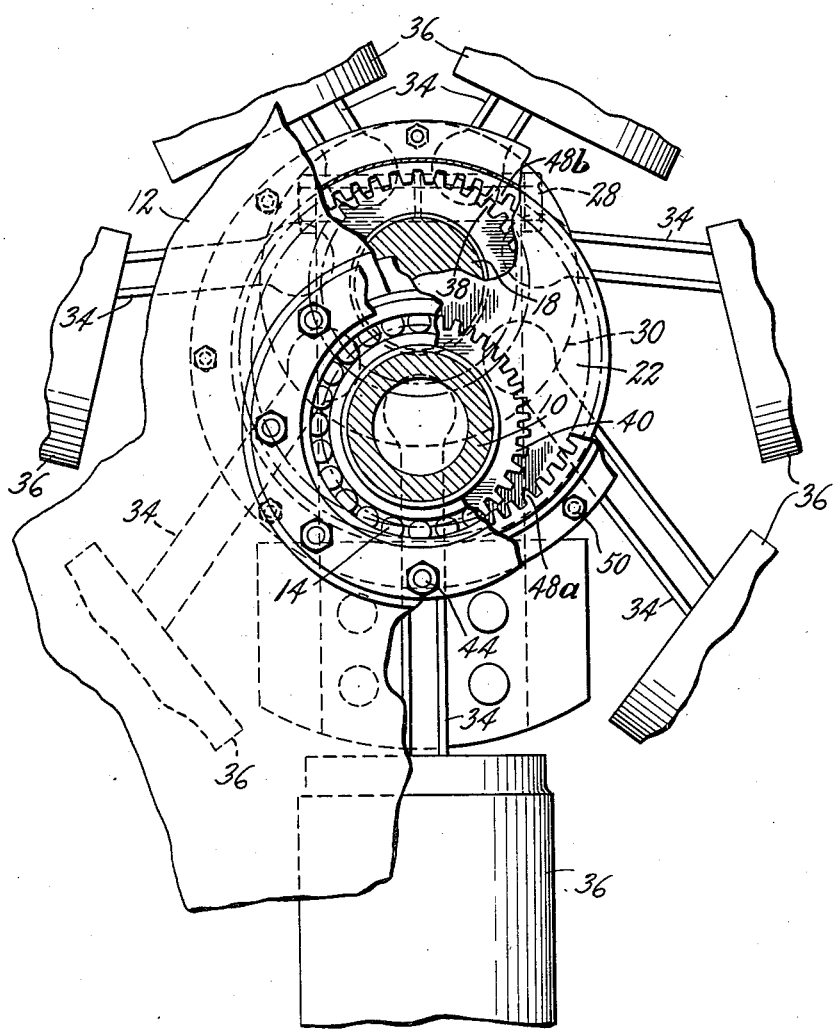
Fig. 2 is a transverse sectional view, broken away in part, showing the connecting rod structure illustrated in Fig. 1.

Referring now more particularly to Figs. 1 and 2 of the drawings, the engine crankshaft is indicated generally at 10, the shaft shown being rotatably mounted in the crank case structure 12 of the engine by means of bearings 14 and 16, which have been shown as being of the roller type.

The shaft 10 carries a crank pin 18 which in the embodiment illustrated is made integral with the main bearing portion 20 and connected thereto by means of a crank web 22. At the end of the crank pin opposite the web 22 it is supported by a web 24 formed integrally with the main bearing portion 26. The crank web 24 is removably clamped to the crank pin by means of a suitable clamping bolt indicated at 28.

A connecting rod mounting member or spool 30 is journaled on the crank pin and has attached thereto, as by means of the knuckle pins 32, the crank pin ends of the group of connecting rods 34, the outer ends of which are attached to the engine pistons 36, one of which appears in Fig. 1, in any suitable manner.

The connecting rod mounting member carries at one side an external tooth gear 38 which is concentric with the axis of the crank pin and which in the embodiment shown is in the form of a straight spur gear formed as an integral part of the member 30.

A second external tooth gear 40, which in the present instance is also a straight spur gear, is mounted to be concentric with the axis of rotation of the crankshaft. This latter gear, in the embodiment illustrated, is in the form of an annulus having a flange portion 42 secured by means of bolts 44 to the crank case structure.

As will be observed from Fig. 1, the gear 38 lies on one side, which may conveniently be considered the inside of the crank web 22, while the gear 40 lies on the opposite or outside of this web. The gears 38 and 40 have the same pitch diameter.

The crank web 22 is circular in cross-section and the periphery provides a circular bearing 46, the center of which lies midway between the axis of the crank pin and the axis of rotation of the crankshaft, on the line connecting these two axes. Journaled on bearing 46 is an internal tooth or crown gear indicated generally at 48. In the embodiment illustrated this crown gear comprises 2 halves 48a and 48b secured together by means of bolts 50. Each of these gear parts are recessed so that when the gear is assembled it may be said to embracingly engage the web to prevent axial displacement of the gear with respect to the crankshaft. Each part of the gear is provided with a set of internal teeth, the two sets being of like pitch diameter and the teeth on the part 48a being located outside the crank web to mesh with the gear 40 while the teeth on the part 48b are located inside the crank web to mesh with the gear 38.

The operation of the method will be more or less evident from the drawings. If, as assumed, the crank shaft revolves, the engagement of the internal gear with the stationary gear 40 causes the internal gear to rotate relative to the crank web in a direction opposite to the direction of rotation of the crankshaft relative to the crank case structure and the engagement of the internal gear with the gear 38 on the connecting rod member 30 will cause the latter gear to rotate relative to the crank pin in opposite sense to the direction of rotation of the crank pin about the axis of the crankshaft. Since the pitch diameters of the gears 38 and 40 are the same, the rotary motion of the gear 38 relative to the crank pin is equal and opposite to the rotation of the crank pin about the axis of the crankshaft and imparts to the connecting rod mounting member motion parallel to itself in the circular orbit of the crank pin.

It will readily be apparent that the same character of like rotary motion of the crank ends of the connecting rods, relative to their respectively associated cylinders, will be obtained if the crankshaft is held stationary and the cylinder bank rotates. In the latter case, the gear 40 will be rotative rather than stationary, but in either case, gear 40 constitutes what may conveniently be termed an anchor gear which determines the character of the relative rotary motion between the crank pin and the connecting rod member.

In the embodiment illustrated in Fig. 1, the gearing connecting the crank case structure with the connecting rod member is rigid. In some instances however, it may be desirable to provide a connection sufficiently yielding to absorb or reduce shock loads. Such a yielding connection may conveniently be provided by yieldingly mounting the anchor gear 40 as by a spring or rubber cushioned connection between this gear and the crank case structure. One suitable form of yielding connection is illustrated in Fig. 5. In this form of construction the gear 40a is provided with a radially extending flange or a series of radially extending arms 40b carrying a number of axially projecting pins 40c. The crank case member 12a is provided with a series of suitable recesses 12b in which are located cushioning cups 54 of rubber or other suitably yielding material into which the projecting ends of the pins 40c project.

In this form of construction the anchor gear, since it is not rigidly secured to the crank case structure, must be centered by other means, which in this instance is conveniently provided by means of a bearing bushing 56 between the gear and the crankshaft, this bushing advantageously being flanged as at 56a to provide a thrust bearing between the gear and the crankshaft for maintaining the gear in proper axial position with respect to the remainder of the structure.

It would be evident that other yielding means such as springs may be used in lieu of the rubber cushion mounting and it further will be evident that the yielding connection may be employed if desired in another part of the gearing rather than between the anchor gear and its anchorage.

Construction embodying the principles of the present invention provides numerous advantages among which the following are to be noted. Due to the fact that the gearing employs internal teeth, a larger number of teeth are constantly in meshing contact than would be the case with external tooth gearing and consequently the tooth pressures are relatively low.

As a result of this the gears may be made relatively narrow while still maintaining tooth pressures of desirably low value. Because of the narrow gears that may be employed, the arrangement is axially very compact and as will be observed from Fig. 1, the axial length of the crank pin required to accommodate the gearing is substantially no greater than is necessary to provide adequate bearing area for the connecting rod mounting member journaled on the pin. Likewise, comparatively little clearance is required between the outer face of the crank web 22 and the crankshaft supporting bearing, so that substantially no crankshaft rigidity is sacrificed.

Because of the difference in pitch diameters between the external tooth gears and the crown gear, the speed of rotation of the latter relative to the bearing surface on the crank web is low compared to crankshaft speed so that low bearing speed is obtained between the internal gear and the bearing surface on the crank web. Further, the relatively large diameter of the bearing carried by the crankshaft provides for ample bearing area to enable the internal tooth gear to be carried with relatively very low unit bearing pressures.

Because of the simple and compact nature of the gearing, the additional weight involved is relatively little and while the web of the crankshaft which carries the internal gear may conveniently be turned to provide a solid circular section for the required bearing, the construction may advantageously be made lighter by resorting to the construction illustrated in Figs. 3 and 4.

In this form of construction the crank web 22a is first turned to circular form and is then slotted on opposite sides by milling or other suitable machining operations to provide thereon flanges 22b at the sides of the web on which a suitable bearing ring 46a may be shrunk, welded, or otherwise secured. In some instances the flanges 22b may be stiffened in addition to the stiffening provided by the bearing ring 46a, by means of shouldered spacing pins 52.

It will be evident that the principles of the invention may be embodied in structures differing from that hereinbefore described by way of example, and it is accordingly to be understood that the invention includes all forms of structure falling within the scope of the appended claims when they are construed as broadly as the state of the prior art permits.

What is claimed is:

1. The combination, with a crankshaft having a crank pin, of a connecting rod mounting member on said crank pin, an external tooth gear carried by said mounting member around the crank pin, an external tooth anchor gear around the axis of the crankshaft, and internal tooth gear means meshing with said external tooth gears.

2. The combination, with a crankshaft having a crank pin, of a connecting rod mounting member on said crank pin, an external tooth gear carried by said mounting member and concentric with the axis of the crank pin, an external tooth anchor gear concentric with the axis of rotation of the crankshaft, said gears having the same pitch diameter, and internal tooth gear means carried by the crankshaft and meshing with said external tooth gears.

3. The combination, with a crankshaft having a crank pin and a crank web supporting the crank pin, of a connecting rod mounting member on said crank pin, an external tooth gear carried by said mounting member around the crank pin, an external tooth anchor gear around the axis of the crankshaft, and internal tooth gear means rotatably mounted on said crank web and meshing with said external tooth gears.

4. The combination, with a crankshaft having a crank pin and a crank web supporting the crank pin, of a connecting rod mounting member on said crank pin, an external tooth gear carried by said mounting member and concentric with the axis of the crank pin, an external tooth anchor gear concentric with the axis of the crankshaft, and internal tooth gear means rotatably mounted on said crank web and meshing with said external tooth gears.

5. In an engine having a cylinder bank, a crankshaft having a crank pin, said crankshaft and cylinder bank being mounted for relative rotary movement, a connecting rod mounting member on said crank pin, a first external tooth gear carried by said mounting member around the crank pin, a second external tooth gear anchored to said cylinder bank around the axis of the crankshaft, and internal tooth gear means carried by the crankshaft and meshing with said external tooth gears.

6. In an engine having a cylinder bank including a central crank case structure, a crankshaft having a main bearing, a crank web and a crank pin carried by said web within the crank case structure, a connecting rod mounting member on said crank pin, an external tooth gear carried by said mounting member and concentric with the axis of said crank pin, said gear being on the crank pin side of said web and adjacent thereto, an annular external tooth gear concentric with the axis of the crankshaft, the second mentioned gear being located between the crank web and said main bearing, said gears having the same pitch diameter, and an internal tooth gear rotatably carried by said crank web and having teeth extending axially on opposite sides of the crank web to mesh with the teeth of said external tooth gears.

7. The combination, with a crankshaft having a crank pin and a crank web supporting the crank pin, of a connecting rod mounting member on said crank pin, an external tooth gear carried by said mounting member around the crank pin and adjacent to the inner face of the crank web, an external tooth anchor gear around the axis of the crankshaft and adjacent to the outer face of the crank web, a bearing on said crank web having its center mid way between the axes of said gears, and an internal tooth gear rotatably mounted on said bearing and having two sets of teeth, one of said sets being located on the inside of the crank web and meshing with the gear on the connecting rod member and the other of said sets being located outside of the crank web and meshing with said anchor gear.

8. The combination, with a crankshaft having a crank pin and a crank web supporting the crank pin, of a connecting rod mounting member on said crank pin, an external tooth gear carried by said mounting member concentric with the axis of the crank pin and adjacent to the inner face of the crank web, an annular external tooth anchor gear concentric with the axis of rotation of the crankshaft and adjacent to the outer face of the crank web, a bearing on said crank web having its center midway between the axis of rotation of the crankshaft and the axis of the crank pin, and an internal tooth gear member rotatably mounted on said bearing, said member being axially separable and comprising parts embracingly engaging the crank web to axially locate the member with respect to the crankshaft and said member further being provided with two sets of teeth, one set being located on the inside of the crank web and meshing with the gear on the connecting rod member and the other set being located on the outside of the crank web and meshing with said anchor gear.

9. The combination, with a crankshaft having a crank pin of a connecting rod mounting member on said crank pin, an anchorage, a gear system comprising an external tooth gear carried by said mounting member around the crank pin, an external tooth anchor gear around the axis of the crankshaft and connected to said anchorage, internal tooth gear means meshing with said external tooth gears and yielding means associated with said gear system to provide a yielding connection in the path of force transmission between said connecting rod mounting member and said anchorage.

10. The combination, with a crankshaft having a crank pin of a connecting rod mounting member on said crank pin, an external tooth gear carried by said mounting member around the crank pin, an external tooth anchor gear around the axis of the crankshaft, internal tooth gear means meshing with said external tooth gears and a yielding connection between said anchor gear and its anchorage.

11. In an engine having a cylinder bank including crank case structure, a crankshaft having a crank pin, said crankshaft and cylinder bank being mounted for relative rotary movement, a connecting rod mounting member on said crank pin, an external tooth gear carried by said mounting member around the crank pin, an external tooth anchor gear around the axis of said crankshaft, internal tooth gear means carried by the crankshaft and meshing with said external tooth gears, a bearing between the crankshaft and said anchor gear for centering the latter and a yielding connection between said anchor gear and said crank case structure.

12. In apparatus of the character described, a crankshaft having a main bearing, a crank pin and a crank web providing a connection between said main bearing and said crank pin, said crank web providing a bearing having its center located midway between the axis of said main bearing and the axis of said crank pin.

13. In apparatus of the character described, a crankshaft having a main bearing, a crank pin and a crank web providing a connection between said main bearing and said crank pin, said crank web providing a circular bearing having its center located midway between the axis of the crankshaft and the axis of the crank pin, and certain portions of the crank web radially outside the portion forming the connection between the crank pin and the main bearing and within the circumference of said circular bearing being cut away.

14. In apparatus of the character described, a crankshaft having a crank pin and a crank web supporting the crank pin, said crank web being formed to provide relatively thin disc-like side flanges having centers located midway between the axis of the crankshaft and the axis of the crank pin, and a circular bearing member fixed to the crank web to form a part thereof, said bearing member being supported by said disc-like flanges.

LARS J. ISTAD.